(12) United States Patent
You et al.

(10) Patent No.: US 11,226,519 B2
(45) Date of Patent: Jan. 18, 2022

(54) OPTICAL MODULATION ELEMENT

(71) Applicant: LG Chem, Ltd., Seoul (KR)

(72) Inventors: Jung Sun You, Daejeon (KR); Dong Hyun Oh, Daejeon (KR); Nam Gyu Kim, Daejeon (KR); Eun Jung Lim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/734,347

(22) PCT Filed: Jul. 2, 2019

(86) PCT No.: PCT/KR2019/008075
§ 371 (c)(1),
(2) Date: Dec. 2, 2020

(87) PCT Pub. No.: WO2020/009443
PCT Pub. Date: Jan. 9, 2020

(65) Prior Publication Data
US 2021/0223595 A1    Jul. 22, 2021

(30) Foreign Application Priority Data

Jul. 2, 2018 (KR) .................. 10-2018-0076481
Jul. 2, 2019 (KR) .................. 10-2019-0079555

(51) Int. Cl.
*G02F 1/1339* (2006.01)
*G02C 7/08* (2006.01)
*G02F 1/137* (2006.01)
*G02F 1/1343* (2006.01)

(52) U.S. Cl.
CPC .......... *G02F 1/13392* (2013.01); *G02C 7/08* (2013.01); *G02F 1/137* (2013.01); *G02F 1/134309* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 7,692,755 B2 | 4/2010 | Sugiura et al. |
| 7,705,959 B2 | 4/2010 | Kim et al. |
| 8,441,707 B2 | 5/2013 | Lam et al. |
| 8,741,434 B2 | 6/2014 | Han et al. |
| 8,963,413 B2 | 2/2015 | Fischer et al. |
| (Continued) | | |

FOREIGN PATENT DOCUMENTS

| | | |
|---|---|---|
| JP | 200493873 A | 3/2004 |
| JP | 4512415 B2 | 7/2010 |
| (Continued) | | |

OTHER PUBLICATIONS

International Search Report for Application No. PCT/KR2019/008075 dated Oct. 7, 2019, 2 pages.
(Continued)

*Primary Examiner* — Richard H Kim
(74) *Attorney, Agent, or Firm* — Lerner, David, Littenberg, Krumholz & Mentlik, LLP (57) ABSTRACT

A light modulation element and the use thereof are provided. The light modulation element can suppress a surface waviness phenomenon upon surface reflection visual observation by improving surface waviness of a base film caused by a spacer. Such light modulation element can be applied to various flexible display devices to improve the quality of products.

19 Claims, 3 Drawing Sheets

(56) References Cited

U.S. PATENT DOCUMENTS

| | | |
|---|---|---|
| 9,146,428 B2 | 9/2015 | Jang et al. |
| 2012/0044560 A9 | 2/2012 | Lam et al. |
| 2016/0002606 A1 | 1/2016 | Peterka et al. |
| 2019/0049641 A1 | 2/2019 | Oh et al. |
| 2019/0079327 A1 | 3/2019 | Kim et al. |

FOREIGN PATENT DOCUMENTS

| | | | |
|---|---|---|---|
| JP | 2012529661 A | 11/2012 | |
| JP | 2017198744 A | 11/2017 | |
| KR | 20070120694 A | 12/2007 | |
| KR | 20170072573 A | 6/2017 | |
| KR | 101775332 B1 | 9/2017 | |
| KR | 20170117893 A | 10/2017 | |

OTHER PUBLICATIONS

Extended European Search Report including Written Opinion for Application No. 19830923.9 dated Jul. 1, 2021, pp. 1-8.

ific OPTICAL MODULATION ELEMENT

CROSS-REFERENCE TO RELATED APPLICATION

This application is a national phase entry under 35 U.S.C. § 371 of International Application No. PCT/KR2019/008075 filed Jul. 2, 2019, which claims priority from Korean Patent Application No. 10-2018-0076481 filed on Jul. 2, 2018 and Korean Patent Application No. 10-2019-0079555 filed on Jul. 2, 2019, the disclosures of which are incorporated herein by reference in their entirety.

TECHNICAL FIELD

This application relates to a light modulation element and its use.

BACKGROUND ART

In Patent Document 1 (Korean Patent Publication No. 1775332), a light modulation element such as a liquid crystal cell may generally comprise a spacer to maintain a cell gap between an upper base film and a lower base film. Furthermore, when the light modulation element is to be applied to a banded flexible display device such as eyewear, a flexible base film may be required for the upper base film and the lower base film.

However, when the flexible base film is applied to manufacture a light modulation element, there may arise a problem that bends are generated on the surfaces of the upper base film and the lower base film due to the difference in degree of being pressed on the portion where the spacer exists and the portion where the spacer does not exist. Due to this surface waviness, if the surface of the light modulation element is observed with reflection visual appreciation, the surface waviness is confirmed, whereby there may arise a problem that the quality of products is deteriorated. Therefore, there is a demand for a light modulation element capable of improving the surface waviness of the base film caused by the spacer.

DISCLOSURE

Technical Problem

It is a problem of the present invention to provide a light modulation element which can improve surface waviness of a base film caused by a spacer to suppress a surface waviness phenomenon upon surface reflection visual appreciation.

Technical Solution

The present application relates to a light modulation element. The light modulation element may comprise a first base film and a second base film disposed opposite to each other. The light modulation element may comprise a light modulating layer disposed between the first base film and the second base film. The light modulating layer may comprise a spacer. The light modulation element may further comprise a buffer layer disposed outside one or more base films of the first base film and the second base film. The buffer layer may be formed outside the first base film, formed outside the second base film, or formed outside each of the first base film and the second base film.

In this specification, the "light modulating layer" may mean a functional layer capable of varying light transmittance, reflectance, haze, or the like depending on whether or not external energy is applied.

In this specification, the "buffer layer" may mean a functional layer capable of alleviating the surface waviness of the base film caused by the spacer.

In this specification, the term "inside" means the side toward the light modulating layer in the light modulation element, and the "outside" means the opposite side of the side toward the light modulating layer in the light modulation element.

Figure 1:
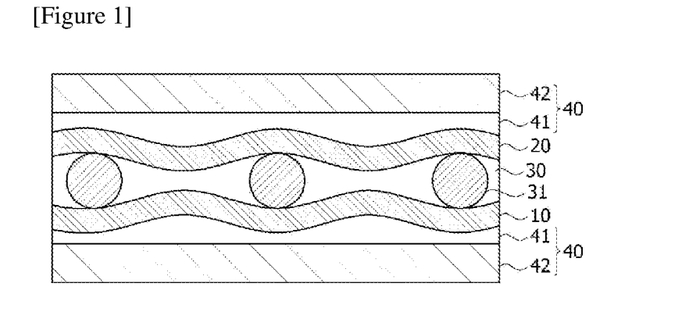
FIG. 1 exemplarily shows a light modulation element of the present application.

FIG. 1 exemplarily shows a light modulation element of the present application. FIG. 1 exemplarily shows a light modulation element comprising a first base film (10) and a second base film (20) disposed opposite to each other, a light modulating layer (20), including spacers (31), disposed between the first base film (10) and the second base film (20), and a buffer layer (40) disposed outside each of the first base film (10) and the second base film (20).

The light modulating layer may comprise a spacer. The spacer may function as a cell gap holding member that maintains the interval between the first base film and the second base film. The spacer may be a ball spacer or a column spacer. The spacer may comprise one or more selected from a polymer-based material, a carbon-based material, an oxide-based material, and a composite material thereof. The material of the ball spacer may be specifically silica, a polysiloxane polymer or a divinylbenzene copolymer. The material of the column spacer may be specifically a UV curable acrylate or an epoxy. In one example, the spacer may be a black spacer. The black ball spacer may comprise carbon black, and the black column spacer may also comprise carbon black.

The size of the spacer may be appropriately adjusted in consideration of the interval (cell gap) between the first base film and the second base film. The size of the spacer may mean a particle diameter in the case of a ball spacer and may mean a height in the case of a column spacer. The size of the spacer may be, for example, 1 µm to 50 µm. The size of the spacer may be specifically 1 µm or more, 2 µm or more, or 3 µm or more, and may be 50 µm or less, 40 µm or less, 30 µm or less, or 20 µm or less.

The light modulating layer may comprise a plurality of spacers. At this time, the plurality of spacers may be present in a state of being spaced apart from each other in the light modulating layer. In this specification, the "state of being spaced apart" may mean that they are present in a state of being spread apart at a predetermined interval.

The first base film and/or the second base film may have surface waviness due to the difference in degree of being pressed in the region where the spacer exists and the region where the spacer is not present in the light modulating layer. By forming the buffer layer outside the first base film and/or the second base film, the light modulation element of the present application can improve the degree of recognition of the surface waviness, and accordingly can suppress the phenomenon that the surface waviness is observed upon surface reflection visual appreciation.

Hereinafter, the buffer layer will be described in detail. As shown in FIG. 1, the buffer layer (40) may comprise a buffer film (42) and a pressure-sensitive adhesive layer (41) sequentially.

The buffer film may have both flat surfaces. As the buffer film, a flexible film having optical transparency can be used. For example, an optically transparent plastic film can be used as the buffer film. Specifically, the plastic film can be exemplified by a cellulose film such as a DAC (diacetyl cellulose) or TAC (triacetyl cellulose) film; a COP (cycloolefin copolymer) film such as a norbornene derivative resin film; an acrylic film such as a PMMA (poly(methyl methacrylate)) film; a PC (polycarbonate) film; an olefin film such as a PE (polyethylene) or PP (polypropylene) film; a PVA (polyvinyl alcohol) film; a PES (polyether sulfone) film, a PEEK (polyetheretherketone) film; a PEI (polyetherimide) film; a PEN (polyethylenenaphthatate) film; a polyester film such as a PET (polyethyleneterephtalate) film; a PI (polyimide) film; a PSF (polysulfone) film; a PAR (polyarylate) film or a fluororesin film, and the like, in general, a cellulose film, a polyester film or an acrylic film, and the like can be used, and preferably a TAC film or a PC film can be used, but it may be suitably selected in consideration of the object of the present application.

The buffer film may have a thickness of 50 μm or more. Such a thickness range may be more advantageous in improving the surface waviness of the base film. The upper limit of the thickness of the buffer film may be, for example, 1000 μm or less. Specifically, the thickness of the buffer film may be 50 μm or more, 100 μm or more, or 150 μm or more, and may be 1000 μm or less, 900 μm or less, 800 μm or less, 700 μm or less, 600 μm or less, or 550 μm or less. Depending on the material of the buffer film, the thickness range may also be appropriately selected. In one example, when a PC film is used as the buffer film, the thickness range may be 200 μm to 800 μm or 400 μm to 600 μm. In another example, when a TAC film is used as the buffer film, the thickness range may be from 50 μm to 350 μm or from 150 μm to 250 μm.

The pressure-sensitive adhesive layer may have a flat surface facing the buffer film and a surface with surface waviness facing the light modulating layer. Specifically, the pressure-sensitive adhesive layer is attached to the bends generated on the surface of the first base film and/or the second base film of the light modulation element, where the side corresponding to the surface waviness of the first base film and/or the second base film may have the surface waviness, and the opposite side thereof may be formed flat. As a result, the buffer film is formed on the flat side of the pressure-sensitive adhesive layer, so that both surfaces can be flat.

The pressure-sensitive adhesive layer may comprise an OCA (optically clear adhesive) pressure-sensitive adhesive. The OCA pressure-sensitive adhesive may be a pressure-sensitive type pressure-sensitive adhesive, and for example, known pressure-sensitive adhesives such as acrylic pressure-sensitive adhesives, silicone-based pressure-sensitive adhesives, rubber-based pressure-sensitive adhesives, and urethane pressure-sensitive adhesives may be used without particular limitation. The OCA adhesive has a concept of being distinguished from an OCR (optically clear resin) pressure-sensitive adhesive provided in a liquid phase, which can be provided in a state of mainly solid, semi-solid or elasticity. The pressure-sensitive type pressure-sensitive adhesive is a kind of adhesive, which may mean a material having a function of adhering to an adherend even with only a slight pressure applied to a part of the adhesive without using water, solvent heat or the like.

In order to ensure appropriate surface characteristics, the thickness of the pressure-sensitive adhesive layer can be controlled. For example, the ratio (T1/T2) of the thickness (T1) of the pressure-sensitive adhesive layer to the thickness (T2) of the base film (that is, the base film to which the pressure-sensitive adhesive layer is attached) may be in a range of about 0.1 to 4. In another example, the ratio (T1/T2) may be about 0.2 or more, about 0.3 or more, or about 0.4 or more, or may also be about 3.5 or less, about 3 or less, about 2.5 or less, about 2 or less, about 1.9 or less, 1.8 or less, 1.7 or less, 1.6 or less, 1.5 or less, 1.4 or less, 1.3 or less, 1.2 or less, 1.1 or less, or 1 or less or so.

On the other hand, the ratio (T3/T1) of the thickness (T3) of the buffer film to the thickness (T1) of the pressure-sensitive adhesive layer may be in a range of about 0.25 to 50. In another example, the ratio (T3/T1) may be about 0.5 or more, about 0.75 or more, about 1 or more, about 1.25 or more, about 1.5 or more, about 1.75 or more, about 2 or more, about 2.25 or more, or about 2.5 or more, or may also be about 40 or less, about 30 or less, about 20 or less, about 10 or less, about 9 or less, about 8 or less, about 7 or less, about 6 or less, or about 5 or less or so.

In this range, it is possible to effectively solve the surface waviness problem of the light modulation element, in particular, the light modulation element that a cell gap is ensured at an appropriate level while a thin base film is also applied.

Figure 2:
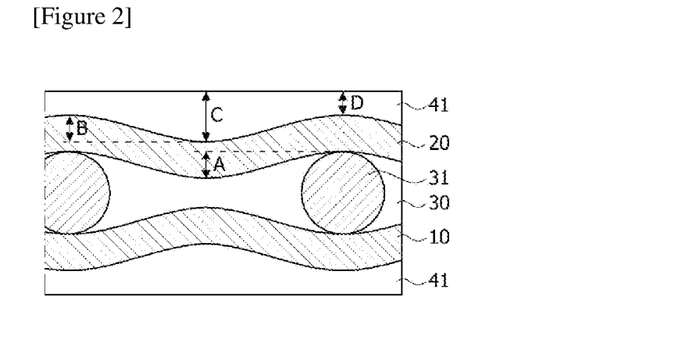
FIG. 2 is a partially enlarged diagram of a light modulation element for explaining surface waviness.

FIG. 2 is a partially enlarged diagram of a light modulation element for explaining surface waviness caused by a spacer. As described above, one or more base films of the first base film (10) and the second base film (20) may have surface waviness caused by the spacer (31). In the base film having surface waviness, both surfaces may have surface waviness.

The surface waviness may have a convex portion in the region of the base film corresponding to the region where the spacer is present and a concave portion in the region of the base film corresponding to the region where the spacer is not present.

In one example, the height difference (B in FIG. 2) between the most convex region and the most concave region in the surface waviness of the base film may be 0.1 μm to 1 μm. Specifically, the height difference (B) may be 0.2 μm to 0.8 μm or 0.4 μm to 0.6 μm. This height difference may depend on the size of the spacer or the flexibility of the base film.

As shown in FIG. 2, the light modulating layer (30) can also have surface waviness by the surface waviness of the base film caused by the spacer. Like the base film, the light modulating layer may have a convex portion in the region where the spacer is present and a concave portion in the region where the spacer is not present.

In one example, the height difference (A in FIG. 2) between the most convex region and the most concave region in the surface waviness of the light modulating layer may be 0.1 μm to 1 μm. The height difference (A) may be, specifically, 0.2 μm to 0.8 μm or 0.4 μm to 0.6 μm.

As shown in FIG. 2, in the state where the pressure-sensitive adhesive layer has been applied to the base film having surface waviness, one side of the pressure-sensitive adhesive layer (41) can also have the surface waviness by the surface waviness of the base film caused by the spacer. The pressure-sensitive adhesive layer may have a concave portion in the region corresponding to the region where the spacer is present and a convex portion in the region corresponding to the region in which the spacer is not present.

In one example, the pressure-sensitive adhesive layer may have a thickness of 20 μm or more. This thickness range may be more advantageous in improving the surface waviness of the base film. The thickness of the pressure-sensitive adhesive layer may be, specifically, 20 μm or more, 50 μm or more, or 80 μm or more, and may be 200 μm or less, 150 μm or less, or 120 μm or less. The thickness of the pressure-sensitive adhesive layer may mean the thickness of the pressure-sensitive adhesive layer itself before the pressure-sensitive adhesive layer is applied to the base film having surface waviness.

In one example, in the state where the pressure-sensitive adhesive layer has been applied to the base film having surface waviness, the difference (C-D in FIG. 2) between the maximum value and the minimum value of the thickness in the pressure-sensitive adhesive layer may have the same value as the height difference (B) between the most convex region and the most concave region. Accordingly, the difference (C-D) between the maximum value and the minimum value of the thickness in the pressure-sensitive adhesive layer may be 0.1 µm to 1 µm, 0.2 µm to 0.8 µm, or 0.4 µm to 0.6 µm. Here, the maximum value (C) and the minimum value (D) of the thickness in the pressure-sensitive adhesive layer may mean the maximum value and the minimum value of the thickness measured on the basis of the outer surface having the flat surface in the state where the pressure-sensitive adhesive layer has been applied to the base film having surface waviness, respectively.

In the state where the pressure-sensitive adhesive layer has been applied to the base film having surface waviness, the maximum value (C) of the thickness in the pressure-sensitive adhesive layer may be a value obtained by summing the height difference due to the surface waviness to the thickness of the pressure-sensitive adhesive layer itself. In one example, when the thickness of the pressure-sensitive adhesive layer itself is 20 µm, the maximum value (C) of the thickness in the pressure-sensitive adhesive layer may be about 20 µm to 21 µm.

In the state where the pressure-sensitive adhesive layer has been applied to the base film having surface waviness, the minimum value (D) of the thickness in the pressure-sensitive adhesive layer may be a value obtained by subtracting the height difference due to the surface waviness from the thickness of the pressure-sensitive adhesive layer itself. In one example, when the thickness of the pressure-sensitive adhesive layer itself is 20 µm, the maximum value (C) of the thickness in the pressure-sensitive adhesive layer may be about 19 µm to 20 µm.

The pressure-sensitive adhesive layer may be attached to one or more base films of the first base film and the second base film in a cured state. The curing of the pressure-sensitive adhesive layer may be performed by application of appropriate energy, for example, irradiation of heat and/or light. In one example, the pressure-sensitive adhesive layer may be prepared in the form that a release film is present on each of both sides. The buffer layer can be formed by removing the release film on one side of the pressure-sensitive adhesive layer and laminating the pressure-sensitive adhesive layer outside the base film, and then removing the release film on the other side of the pressure-sensitive adhesive layer and laminating the buffer film on the pressure-sensitive adhesive layer.

One or more base films of the first base film and the second base film may be flexible films. Specifically, any one of the first base film and the second base film may be a flexible film, or both may be flexible films.

In this specification, the flexible film may mean a film having flexibility. As the flexible film, a flexible film having optical transparency may be used. For example, an optically transparent plastic film may be used as the first base film and/or the second base film. Specifically, the plastic film may be exemplified by a cellulose film or sheet such as a DAC (diacetyl cellulose) or TAC (triacetyl cellulose) film or sheet; a COP (cycloolefin copolymer) film or sheet such as a norbornene derivative resin film or sheet; an acrylic film or sheet such as a PMMA (poly(methyl methacrylate)) film or sheet; a PC (polycarbonate) film or sheet; an olefin film or sheet such as a PE (polyethylene) or PP (polypropylene) film or sheet; a PVA (polyvinyl alcohol) film or sheet; a PES (polyether sulfone) film or sheet; a PEEK (polyetheretherketone) film or sheet; a PEI (polyetherimide) film or sheet; a PEN (polyethylenenaphthatate) film or sheet; a polyester film such as a PET (polyethyleneterephtalate) film or sheet; a PI (polyimide) film or sheet; a PSF (polysulfone) film or sheet; a PAR (polyarylate) film or sheet; or a fluororesin film or sheet, and the like, and generally a cellulose film or sheet, a polyester film or sheet, or an acrylic film or a sheet, and the like may be used, and preferably a PET film or sheet may be used, but it can be appropriately selected in consideration of the object of the present application.

The smaller the radius of curvature, the flexible film can be more advantageous in terms of flexibility. In one example, the radius of curvature of the flexible film may be adjusted to a level of about 1 mm to 10 mm or so, if necessary. The radius of curvature of the light modulation element applying such a flexible film may be about 40 mm to 50 mm or so. The fact the radius of curvature of the light modulation element becomes somewhat larger is because cracks of the electrode layer or adhesion force of a sealant for maintaining the cell gap, and the like can be considered. The radius of curvature of the flexible display device, to which such a light modulation element is applied, may be about 50 mm to 200 mm or so. The radius of curvature of the flexible film, the light modulation element or the flexible display device can be appropriately changed in consideration of the shape of the final product.

The ratio (T4/T5) of the thickness (T4) of the first and/or second base film as above and the interval (i.e., cell gap) (T5) between the first and second base films disposed opposite to each other may be in a range of about 1 to 100. In another example, the ratio (T4/T5) may be about 1 or more, about 2 or more, or about 3 or more or so, or may also be about 90 or less, about 80 or less, about 70 or less, about 60 or less, about 50 or less, or about 40 or less or so.

In one example, the thickness (T4) of the base film in the state as above may be in a range of about 20 µm to 200 µm. In another example, the thickness may be about 30 µm or more, about 40 µm or more, or about 50 µm or more, or may also be about 190 µm or less, about 180 µm or less, about 170 µm or less, about 160 µm or less, or about 150 µm or less or so.

The thickness (T4) of the base film may be at least a thickness of the base film to which the electrode layer is attached inside.

Through the thickness control of such a base film, it is possible to provide a light modulation element which is thin and has excellent flexibility and simultaneously secures the desired optical performance, and in that state, through the presence of the above-described buffer layer, it is also possible to prevent the performance degradation due to surface waviness and the like.

As the first electrode layer and/or the second electrode layer, a transparent conductive layer may be used. For example, as the first electrode layer and/or the second electrode layer, one formed by depositing a conductive polymer, a conductive metal, a conductive nanowire, or a metal oxide such as ITO (indium tin oxide), and the like, can be used. The thicknesses of the first electrode layer and/or the second electrode layer may be 15 nm to 25 nm, respectively.

In one example, the light modulation element may further comprise an alignment film (not shown) inside the first base film and/or the second base film. Specifically, the alignment film may exist inside the first electrode layer and/or the second electrode layer.

As described below, when the light modulating layer comprises a liquid crystal compound as a light modulating material, the alignment film may have orientation force capable of controlling the initial alignment state of the liquid crystal compound. The alignment film may be a vertical alignment film or a horizontal alignment film. In the case where the light modulation element comprises a first alignment film inside the first base film and a second alignment film inside the second base film, both the first alignment film and the second alignment film may be vertical alignment films or horizontal alignment films, or any one may be a vertical alignment film and the other may be a horizontal alignment film. As the alignment film, a contact type alignment film, such as a rubbing alignment film, or an alignment film including a photo alignment film compound and known to be capable of exhibiting orientation characteristics by a non-contact method such as irradiation with linearly polarized light, can be used.

The light modulation element of the present application can vary transmittance, reflectance or haze, and the like depending on whether or not external energy, for example, a voltage is applied to the light modulating layer. The range of the transmittance, reflectance or haze, and the like, which is varied, can be appropriately controlled in accordance with the use of the light modulation element.

The light modulating layer may comprise a light modulating material. The light modulating material may be included in the region where no spacer is present in the light modulating layer. The light modulating material may be exemplified by a liquid crystal compound. As the liquid crystal compound, a liquid crystal compound, the orientation direction of which can be changed by external voltage application, can be used without any particular limitation. As the liquid crystal, for example, a smectic liquid crystal, a nematic liquid crystal or a cholesteric liquid crystal, and the like can be used. Furthermore, the liquid crystal may be, for example, a compound without any polymerizable group or crosslinkable group so that the orientation direction can be changed by external voltage application.

The light modulating layer may further comprise an anisotropic dye. The anisotropic dye can contribute to the transmittance variation by improving a light shielding ratio of the light modulation element. In this specification, the term "dye" may mean a material capable of intensively absorbing and/or modifying light within at least a part or all of the entire range in a visible light region, for example, a wavelength range of 400 nm to 700 nm. Furthermore, in this specification, the term "anisotropic dye" may mean a material capable of anisotropic absorption of light in at least a part or the entire range of the visible light region. As the anisotropic dye, for example, a known dye known to have the characteristics that can be aligned according to the alignment state of the liquid crystal can be selected and used, and for example, a black dye can be used. Such a black dye is known, for example, as an azo dye or an anthraquinone dye, but is not limited thereto.

Figure 3:
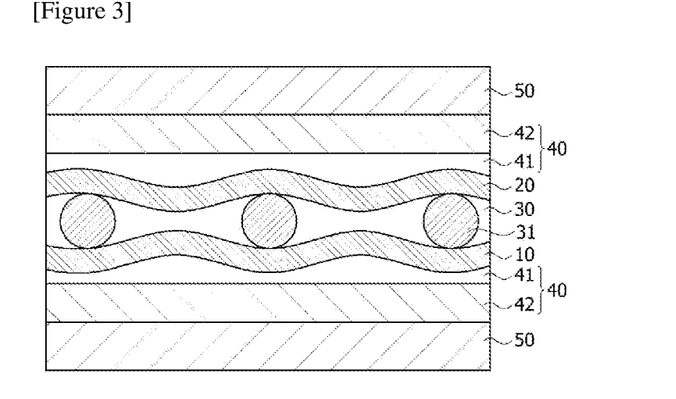
FIG. 3 exemplarily shows a light modulation element of the present application.

The light modulation element of the present application may further comprise a functional layer. The functional layer may be disposed outside the buffer layer. FIG. 3 exemplarily shows a light modulation element in which a functional layer (50) is disposed outside a buffer layer (40), for example, a buffer film (42). The light modulation element of the present application can reinforce various functions by disposing functional layers outside the buffer layer.

The type of the functional layer may be appropriately selected in consideration of the function to be reinforced in the light modulation element. In one example, the functional layer may comprise an anti-fog layer, a self-healing layer, an anti-reflection layer, an anti-finger layer, an anti-fouling layer, an anti-glare layer, a mirror layer or a hardness enhancing layer. In the industry, the hardness enhancing layer is also commonly referred to as a "hard coating layer."

Materials for forming the functional layer and forming methods may be appropriately selected from those known in the art and used. For example, the functional layer may be formed by separately preparing a functional layer and then bonding the functional layer outside the buffer layer, coating a functional layer composition outside the buffer layer, or depositing a functional layer material on the buffer layer.

The present application also relates to a use of the light modulation element. The exemplary light modulation element can lower reflection visual appreciation by suppressing the surface waviness of the base film caused by the spacer to enhance the quality of products.

In one example, the light modulation element can be applied to a flexible display device. Such a flexible device can be exemplified by a curved, bendable, foldable or rollable display device.

The flexible display device can be exemplified by eyewear such as sunglasses, AR (augmented reality) or VR (virtual reality); a smart window for building exterior walls; or a sunroof, a front door window, a rear door window, a backlight or a windshield for vehicles, and the like.

When the flexible display device is eyewear, the structure of the eyewear is not particularly limited. That is, the light modulation element can be included in left eye and/or right eye lenses of a known eyewear structure and applied.

For example, the eyewear may comprise a left eye lens and a right eye lens; and a frame for supporting the left eye lens and the right eye lens. In the eyewear, the left eye lens and the right eye lens may each comprise the light modulation element. Such a lens may comprise only the light modulation element, or may also comprise other configurations.

Advantageous Effects

The present application can suppress a surface waviness phenomenon upon surface reflection visual observation by improving surface waviness of a base film caused by a spacer. Such a light modulation element can be applied to various flexible display devices to improve the quality of products.

MODE FOR INVENTION

Hereinafter, the present application will be specifically described by way of examples, but the scope of the present application is not limited by the following examples.

Example 1

As a light modulation element of Example 1, a light modulation element having an eyewear lens shape was produced. Specifically, as a film on which an electrode layer was formed on each of first and second base films, a PC-ITO film (Teijin) having a total thickness of 100 μm, in which an ITO layer was deposited on a PC film, was prepared. A composition comprising a liquid crystal compound (MDA-16-1235, Merck) and a ball spacer (KBN-512, Sekisui Co.) having a particle diameter of 12 μm was applied on the electrode layer of the first base film to form a light modulating layer. At this time, the composition was applied on the PC-ITO film in the inner region of an outer sealant applied in the edge shape of the eyewear lens. After the second base film was laminated so that the electrode layer of the second base film was in contact with the light modulating layer, the surface waviness was formed on both surfaces of the first base film and the second base film due to the difference in force between the first base film and the second base film. At this time, the height difference between the most convex region and the most concave region in the surface waviness of the base film was 0.4 μm. The height difference was confirmed by a roughness measurement method using a laser microscope (OLS4000, Olympus). An OCA pressure-sensitive adhesive (V310, LG Chemical Co., Ltd.) having a thickness of 100 μm was laminated outside the second base film. A TAC film (SAF-RT190, UGAM) having a thickness of 190 μm, in which an anti-fog layer (functional layer) was coated on one side, was laminated on the second base film via the OCA pressure-sensitive adhesive on the second base film to produce a light modulation element. In the light modulation element, the anti-fog layer exists in the outermost side.

Example 2

A light modulation element was produced in the same manner as in Example 1, except that a TAC film (SHC40T190M, DAICEL) having a thickness of 190 μm, in which a hard coating layer was formed on one side instead of the anti-fog layer, was used.

Example 3

A light modulation element was produced in the same manner as in Example 1, except that a PC film (OM81-5, Polyopt) having a thickness of 500 μm, in which a hard coating layer was formed on one side, was used instead of the TAC film having a thickness of 190 μm, in which an anti-fog layer was coated on one side.

Comparative Example 1

Figure 4:
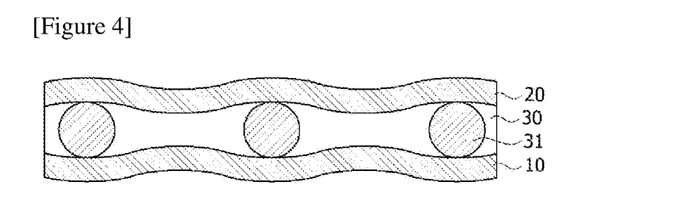
FIG. 4 exemplarily shows the light modulation element of Comparative Example 1.

The light modulation element shown in FIG. 4 was produced in the same manner as in Example 1, except that the pressure-sensitive adhesive layer, the buffer layer and the anti-fog layer were not formed outside the second base film.

Comparative Example 2

A light modulation element was produced in the same manner as in Comparative Example 1, except that a UV curing acrylate resin (LGC) was bar-coated outside the second base film and cured with UV at 3 J to form a coating layer of 3 μm.

Evaluation Example 1. Evaluation of Surface Waviness

In order to evaluate surface waviness, surface reflection visual appreciation was observed for the light modulation elements of Examples and Comparative Examples, and the results were shown in FIGS. 5 to 9. Specifically, in order to prevent the bottom reflection, a black film was placed on the bottom (first base film side) of the light modulation element and a fluorescent lamp stand was placed on the top (functional layer side) of the light modulation element. The digital camera was fixed on the top of the light modulation element at an angle of about 45° on the basis of the front, and then photographed to observe the surface reflection visual appreciation.

Figure 5:
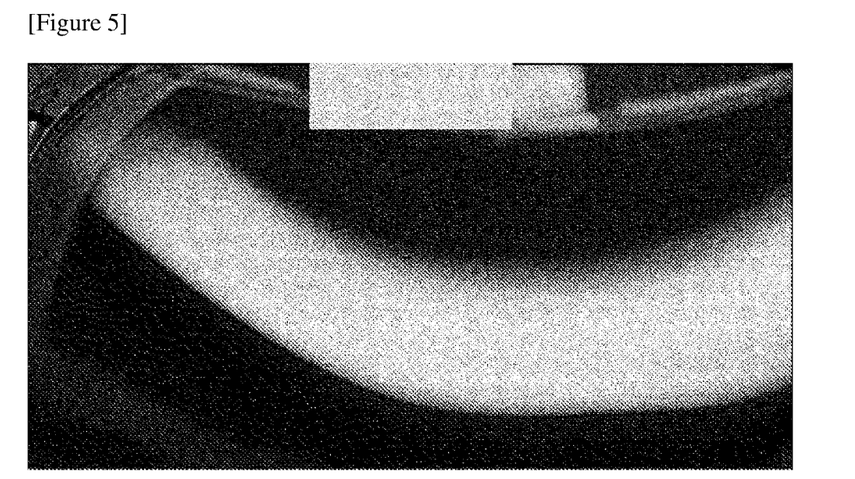
FIG. 5 is the surface waviness evaluation image of Comparative Example 1.
Figure 6:
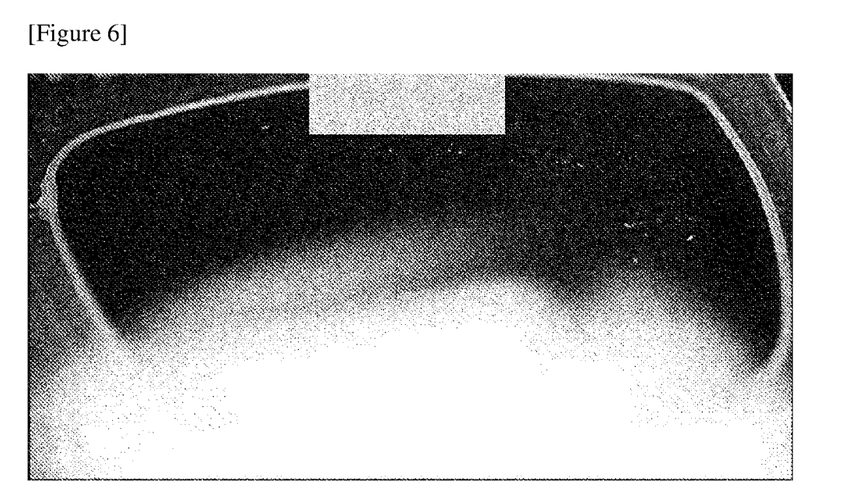
FIGS. 6 to 8 are the surface waviness evaluation images of Examples 1 to 3, respectively.
Figure 7:
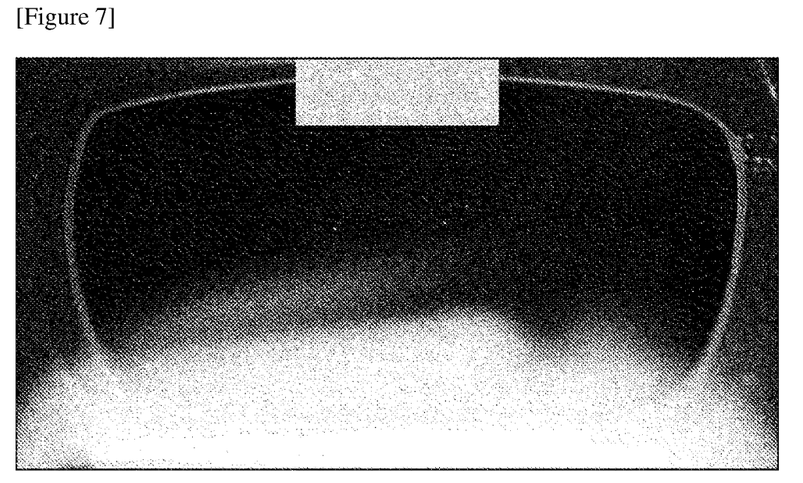
Figure 8:
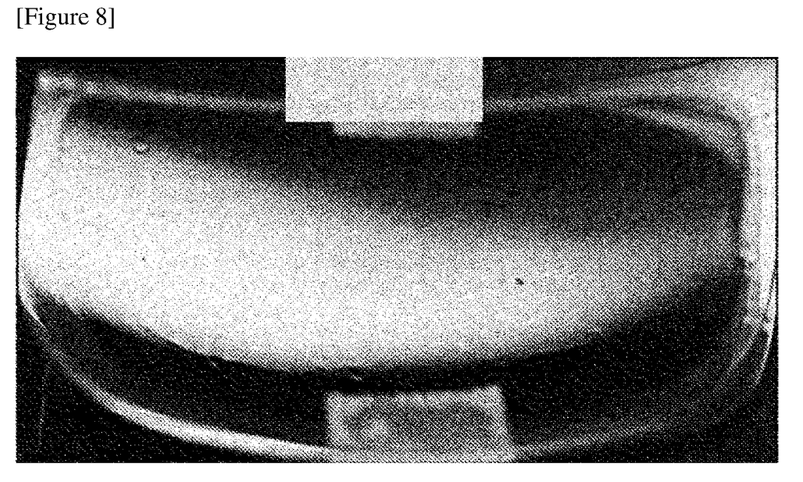
Figure 9:
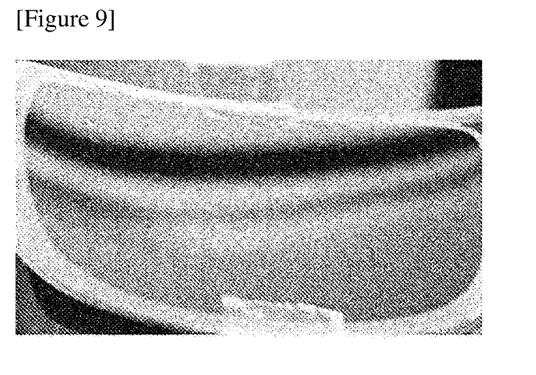
FIG. 9 is the surface waviness evaluation image of Comparative Example 2.

As shown in FIGS. 5 and 9, in Comparative Examples 1 and 2, the surface did not look smooth between the bright region and the dark region inside the light modulation element, and it was observed that there were regions having different heights. On the other hand, as shown in FIGS. 6 to 8, in Examples 1 to 3, regions having different heights between the bright region and the dark region inside the light modulation element were not observed, and they were evaluated to have no surface waviness. From these experimental results, it can be seen that Examples 1 to 3 provided with the buffer layer have solved the surface waviness phenomenon in comparison with Comparative Examples 1 and 2 without any buffer layer.

EXPLANATION OF REFERENCE NUMERALS

10: first base film
20: second base film
30: light modulating layer
31: spacer
40: buffer layer
41: pressure-sensitive adhesive layer
42: buffer film
50: functional layer

The invention claimed is:

1. A light modulation element comprising:
a first base film and a second base film disposed opposite to each other;
a light modulating layer disposed between the first and second base films and including spacers; and
a buffer layer disposed outside one or more base films of the first and second base films wherein the one or more base films of the first base film and the second base film have surface waviness caused by the spacers.

2. The light modulation element according to claim 1, wherein a ratio (T4/T5) of a thickness (T4) of the first or second base film to an interval (T5) between the first and second base films disposed opposite to each other is in a range of 1 to 30.

3. The light modulation element according to claim 1, wherein the spacers are spaced apart from each other in the light modulating layer.

4. The light modulation element according to claim 1, wherein the buffer layer comprises a buffer film and a pressure-sensitive adhesive layer sequentially.

5. The light modulation element according to claim 4, wherein the buffer film is attached outside the one or more base films of the first base film and the second base film via the pressure-sensitive adhesive layer.

6. The light modulation element according to claim 4, wherein the buffer film has flat surfaces on both sides.

7. The light modulation element according to claim 4, wherein the pressure-sensitive adhesive layer has a flat surface facing the buffer film and another surface with surface waviness facing the light modulating layer.

8. The light modulation element according to claim 4, wherein the pressure-sensitive adhesive layer comprises an OCA (optically clear adhesive) pressure-sensitive adhesive.

9. The light modulation element according to claim 4, wherein a ratio (T1/T2) of a thickness (T1) of the pressure-sensitive adhesive layer to a thickness (T2) of the first or second base film is in a range of 0.1 to 4.

10. The light modulation element according to claim 9, wherein a ratio (T3/T1) of a thickness (T3) of the buffer film to the thickness (T1) of the pressure-sensitive adhesive layer is in a range of 0.25 to 50.

11. The light modulation element according to claim 1, wherein the surface waviness has a convex portion in a region of the first and second base films corresponding to a region where the spacer is present and a concave portion in a region of the first and second base films corresponding to a region where the spacer is not present.

12. The light modulation element according to claim 11, wherein a height difference of the surface waviness between the most convex region and the most concave region is 0.1 µm to 1 µm.

13. The light modulation element according to claim 1, wherein the one or more base films of the first base film and the second base film are flexible films.

14. The light modulation element according to claim 1, further comprising a first electrode layer inside the first base film, and a second electrode layer inside the second base film.

15. The light modulation element according to claim 1, wherein a transmittance of the light modulating layer is varied depending on whether or not a voltage is applied to the light modulating layer.

16. The light modulation element according to claim 1, wherein the light modulating layer comprises a liquid crystal compound as a light modulating material.

17. The light modulation element according to claim 1, further comprising a functional layer disposed outside the buffer layer, wherein the functional layer comprises an anti-fog layer, a self-healing layer, an anti-reflection layer, an anti-finger layer, an anti-fouling layer, an anti-glare layer, a mirror layer or a hardness enhancing layer.

18. A flexible display device comprising the light modulation element of claim 1.

19. The flexible display device according to claim 18, wherein the flexible display device is eyewear, wherein the eyewear comprises a left eye lens and a right eye lens each including the light modulation element of claim 1; and a frame for supporting the left eye lens and the right eye lens.

\* \* \* \* \*